(12) United States Patent
Kiyonaga et al.

(10) Patent No.: US 10,352,364 B2
(45) Date of Patent: Jul. 16, 2019

(54) STATE DETECTOR FOR ROLLER BEARING AND ROLLER BEARING DEVICE

(71) Applicant: JTEKT CORPORATION, Osaka-shi, Osaka (JP)

(72) Inventors: Tomohiko Kiyonaga, Kashiba (JP); Shinya Matsuda, Kashiba (JP); Kazushige Otsuka, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/888,310

(22) Filed: Feb. 5, 2018

(65) Prior Publication Data

US 2018/0231059 A1   Aug. 16, 2018

(30) Foreign Application Priority Data

Feb. 14, 2017   (JP) ................. 2017-025029

(51) Int. Cl.
| | |
|---|---|
| F16C 41/00 | (2006.01) |
| F16C 19/36 | (2006.01) |
| F16C 33/46 | (2006.01) |
| F16C 19/52 | (2006.01) |
| G01L 5/00 | (2006.01) |
| B25B 11/02 | (2006.01) |

(52) U.S. Cl.
CPC .......... *F16C 41/007* (2013.01); *F16C 19/361* (2013.01); *F16C 19/522* (2013.01); *F16C 33/46* (2013.01); *B25B 11/02* (2013.01); *F16C 2226/60* (2013.01); *F16C 2233/00* (2013.01); *F16C 2322/39* (2013.01); *G01L 5/00* (2013.01)

(58) Field of Classification Search
CPC ...... F16C 19/26; F16C 19/361; F16C 19/364; F16C 19/52; F16C 19/522; F16C 33/34; F16C 33/46; F16C 33/526; F16C 33/583; F16C 41/007; F16C 2226/60; F16C 2233/00; F16C 2322/39; G01L 1/00; G01L 5/00
USPC ............... 384/448, 456, 470, 548, 560, 565, 384/571–572, 574; 73/862.627
See application file for complete search history.

(56) References Cited

U.S. PATENT DOCUMENTS

| | | | | |
|---|---|---|---|---|
| 4,175,430 A | * | 11/1979 | Morrison | F16C 19/30 |
| | | | | 73/862.541 |
| 5,503,030 A | * | 4/1996 | Bankestrom | F16C 19/522 |
| | | | | 73/862.49 |
| 8,672,553 B2 | * | 3/2014 | Matsuda | F16C 19/522 |
| | | | | 384/448 |

(Continued)

FOREIGN PATENT DOCUMENTS

| | | | |
|---|---|---|---|
| DE | 102004026246 A1 * | 12/2005 | ............. F16C 19/52 |
| DE | 102011006907 B4 * | 2/2018 | ............. F16C 19/52 |

(Continued)

*Primary Examiner* — Marcus Charles
(74) *Attorney, Agent, or Firm* — Oliff PLC

(57) ABSTRACT

The invention includes a sensor mounted in a through-hole formed in the center of a roller of a roller bearing device, a recording device that records detection signals from the sensors, and an installation jig for installing the recording device in the roller. The installation jig passes through the through-hole, and has a first engagement portion that engages with one axial end portion of the roller from an outer side in an axial direction, and a second engagement portion that engages with the other axial end portion of the roller from the outer side in the axial direction.

12 Claims, 10 Drawing Sheets

(56) References Cited

U.S. PATENT DOCUMENTS

| | | | |
|---|---|---|---|
| 8,961,021 B2* | 2/2015 | Stubenrauch | F16C 41/008 |
| | | | 384/448 |
| 9,127,649 B2* | 9/2015 | Matsuda | F16C 41/008 |
| 9,127,719 B2* | 9/2015 | Sykes | F16C 43/065 |
| 2006/0239601 A1* | 10/2006 | Otaka | F16C 33/526 |
| | | | 384/574 |
| 2008/0199117 A1* | 8/2008 | Joki | F16C 19/522 |
| | | | 384/448 |
| 2010/0102801 A1* | 4/2010 | Takahashi | G01D 5/145 |
| | | | 324/207.25 |
| 2011/0002572 A1* | 1/2011 | Miyachi | F16C 33/526 |
| | | | 384/574 |
| 2011/0182536 A1 | 7/2011 | Matsuda et al. | |

FOREIGN PATENT DOCUMENTS

| | | | | |
|---|---|---|---|---|
| JP | 2011007281 A | * | 1/2011 | F16C 19/364 |
| JP | 2011-149538 A | | 8/2011 | |

* cited by examiner

STATE DETECTOR FOR ROLLER BEARING AND ROLLER BEARING DEVICE

INCORPORATION BY REFERENCE

The disclosure of Japanese Patent Application No. 2017-025029 filed on Feb. 14, 2017 including the specification, drawings and abstract, is incorporated herein by reference in its entirety.

BACKGROUND OF THE INVENTION

1. Field of the Invention

The invention relates to a state detector for a roller bearing, and a roller bearing device.

2. Description of Related Art

In recent years, a rolling bearing used for a rolling mill etc. tends to be used in a severe environment, that is being operated at a higher speed or being used for a long period of time in a high load state. Due to structural improvements of an axle box to which the rolling bearing is attached, the distribution of load applied to rolling element of the rolling bearing is becoming more complicated. Thus, it is of great importance to detect the state of the rolling bearing during operation and to accurately analyze the durability and the life of the rolling bearing.

Japanese Patent Application Publication No. 2011-149538 (JP 2011-149538 A) discloses a roller bearing device that can detect the load of the rolling elements as the state of the rolling bearing. As shown in FIG. 11, the roller bearing device 101 described in JP 2011-149538 A has a roller bearing 110 and a load detector that includes load detection sensors 132, a position detection sensor 139, and a recording device 133. The roller bearing 110 has a roller 114 as the rolling element. The load detection sensors 132 detect the load applied to the roller 114. The position detection sensor 139 detects the rotational position of the roller 114 in the revolving direction. The recording device 133 is provided on the roller 114 and records and stores the detection signals of the load detection sensors 132.

Each load detection sensor 132 is composed of a strain gauge that is mounted on the inner surface of a through-hole 122 formed at the axial center of the roller 114. The recording device 133 is composed of a data logger that is mounted via an installation jig 134. The installation jig 134 is fixed to the roller 114 by being fitted in one end portion of the through-hole 122. Thus, the strain gauges 132 and the data logger 133 revolve while rotating with the roller 114 along the raceways of the inner and outer rings 112, 113 of the roller bearing 110.

When the roller bearing 110 described in JP 2011-149538 A is used under severe conditions such as high speed rotation, high vibration, and high temperature etc., a large load is imposed on the strain gauges 132 and the data logger 133 that are attached to the roller 114. In this case, the installation jig 134 of the data logger 133 is only fitted in one end portion of the through-hole 122 of the roller 114, so there is a concern that the fitting of the installation jig 134 will become loose and the installation jig 134 will detach from the roller 114 when the installation jig 134 receives large vibrations or is exposed to high temperatures.

SUMMARY OF THE INVENTION

One object of the invention is to provide a state detector for a roller bearing and a roller bearing device that can prevent a recording device from detaching from a roller.

According to an aspect of the invention, a state detector for a roller bearing includes: a sensor mounted inside a through-hole formed in the center of a roller of the roller bearing device; a recording device that records a detection signal from the sensor; and an installation jig for installing the recording device on the roller. The installation jig passes through the through-hole, and has a first engagement portion that engages with one axial end portion of the roller from an outer side in an axial direction, and a second engagement portion that engages with the other axial end portion of the roller from the outer side in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
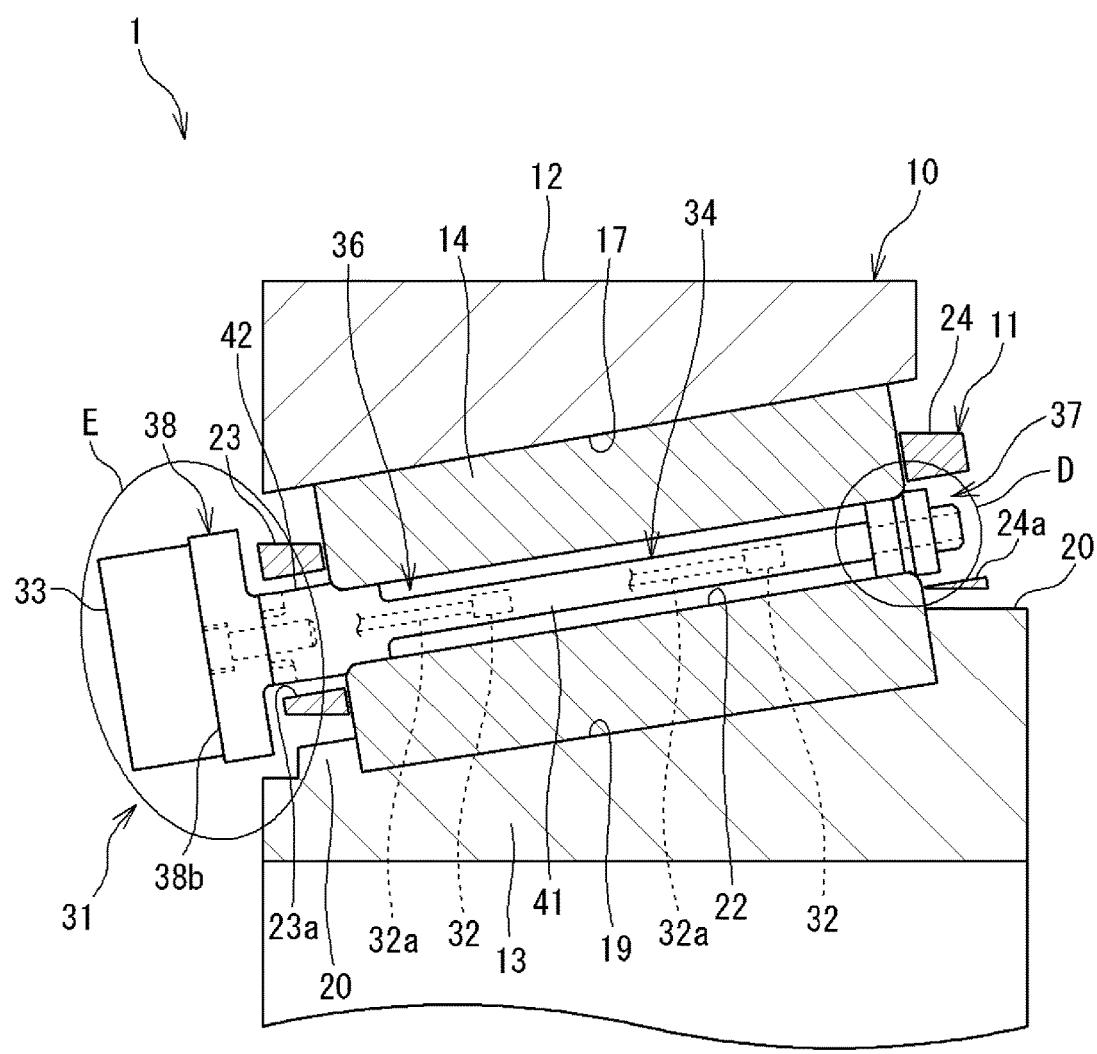
FIG. 1 is a schematic longitudinal sectional view of a roller bearing device to which a state detector according to the embodiment is applied.
Figure 2:
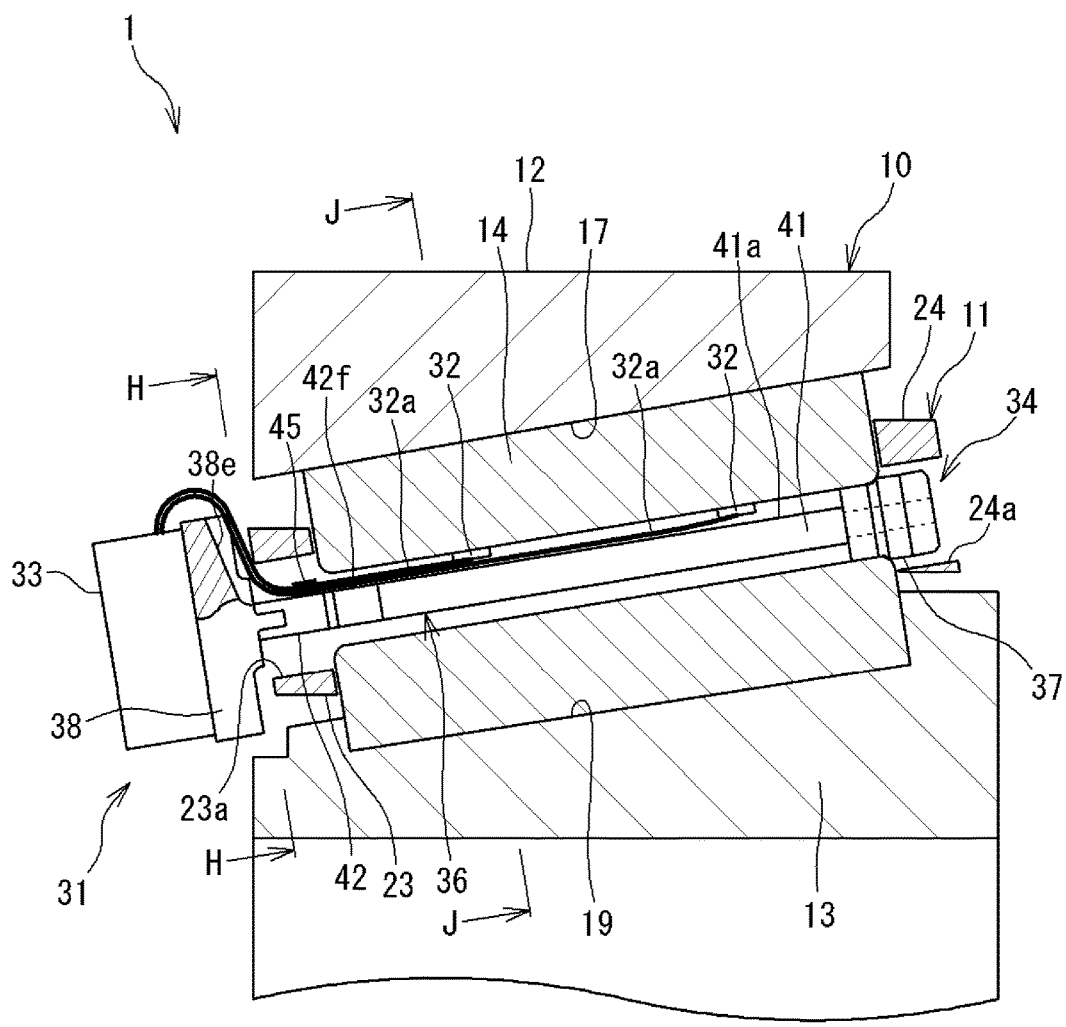
FIG. 2 is a schematic longitudinal sectional view of the roller bearing device illustrating a state in which the roller is rotated 90 degrees relative to FIG. 1.
Figure 3:
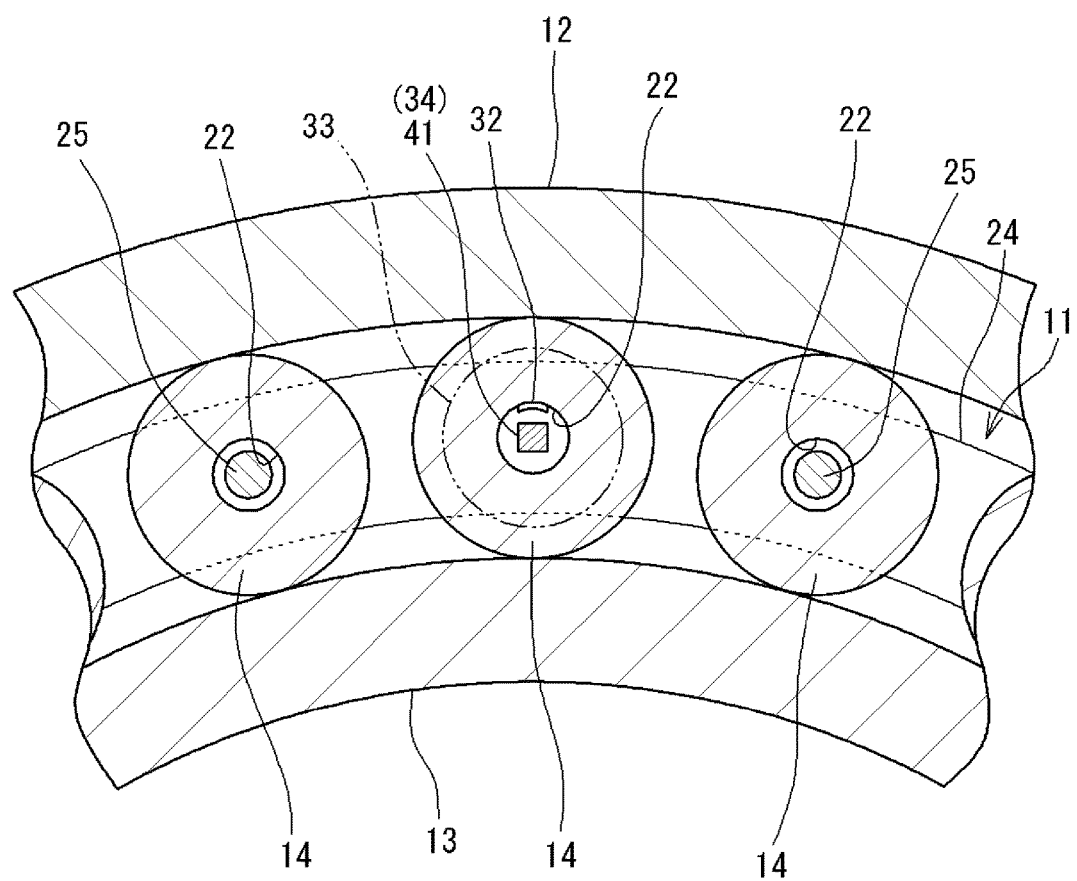
FIG. 3 is a sectional view taken along the line J-J in FIG. 2.

An embodiment of a rolling bearing device of the invention will be described bellow. FIG. 1 is a schematic longitudinal sectional view of the roller bearing device to which a state detector according to the embodiment is applied. FIG. 2 is a schematic longitudinal sectional view of the roller bearing device illustrating a state in which a roller is rotated 90 degrees relative to FIG. 1. FIG. 3 is a sectional view taken along the line J-J in FIG. 2. The roller bearing device 1 of the embodiment includes the roller bearing 10 and the state detector 31.

The roller bearing 10 of the embodiment is the tapered roller bearing 10 that has a pin type cage 11. The roller bearing 10 has an outer ring 12, an inner ring 13, a plurality of tapered rollers 14, and the pin type cage 11. The outer ring 12 has an annular shape and is made of, for example, bearing steel. An outer periphery of the outer ring 12 is fixed to a housing that is not shown. An inner periphery of the outer ring 12 has an outer ring raceway surface 17 inclined relative to the axial direction. The sectional shape of the outer ring 12 is trapezoidal due to its one end in the axial direction being formed thicker in the radial direction than the other end.

The inner ring 13 has an annular shape and is made of, for example, bearing steel. A rotary shaft that is not shown is fitted to an inner periphery of the inner ring 13. An outer periphery of the inner ring 13 has an inner ring raceway surface 19 that is inclined relative to the axial direction and faces the outer ring raceway surface 17. A rib 20 that regulates the movement of the tapered roller 14 in the axial direction is formed on both sides of the inner ring raceway surface 19 in the axial direction.

The tapered rollers 14 each have the shape of a circular truncated cone (truncated cone) made of, for example, bearing steel. The tapered rollers 14 are disposed between the outer ring raceway surface 17 and the inner ring raceway surface 19, held by the cage 11, and disposed with intervals in the circumferential direction. A through-hole 22 is formed in the center of each tapered roller 14. The through-hole 22 is disposed in the center (shaft center) of the tapered roller 14, and passes through the tapered roller 14.

The cage 11 has an annular first ring 23, an annular second ring 24, and round bar-like pins 25 (see FIG. 3). The second ring 24 is spaced apart from the first ring 23 in the axial direction. The pins 25 couple the first and second rings 23, 24. A plurality of mounting holes for mounting both ends of the pins 25 is formed at intervals along the circumferential direction on the first ring 23 and the second ring 24. Each pin 25 passes through the tapered roller 14 via the though-hole 22. Thus, the tapered roller 14 is held by the cage 11. In the tapered roller 14 (the tapered roller 14 that is shown in the center in the lateral direction in FIG. 3) in which the state detector 31 is mounted, the pin 25 does not pass through the though-hole 22, but a part of the state detector 31 (an installation jig 34 that will be described below) is in the through-hole 22, as shown in FIG. 1 and FIG. 2. In the first ring 23 and the second ring 24, insertion holes 23a, 24a that have a larger radius than the mounting hole for mounting the pin 25 are formed. The installation jig 34 is inserted in the insertion holes 23a, 24a.

The inner ring 13 of the tapered roller bearing 10 rotates with the rotation of the rotary shaft. Along with the rotation of the inner ring 13, each tapered roller 14 revolves around the axial center of the tapered roller bearing 10 while rotating around its own axial center.

The state detector 31 includes sensors 32 and a recording device 33 that are provided on one or more of the tapered rollers 14 of the tapered roller bearing 10. The state detector 31 of the embodiment is a load detector that detects the rolling element load, which is applied on the tapered roller bearing 10, as the state of the tapered roller bearing 10. A so-called strain gauge is used as the sensor 32.

Two strain gauges 32 are mounted on the inner peripheral surface of the through-hole 22 of the tapered roller 14. The strain gauges 32 are disposed at intervals in the axial direction of the tapered roller 14, and are arranged in the same phase in the circumferential direction (same circumferential position) of the through-hole 22. The strain gauges 32 are composed of an active gauge and a dummy gauge for temperature compensation, and are connected to the recording device 33 via lead wires 32a. The strain gauges 32 detect the load on the tapered roller 14 by detecting the strain generated in the tapered roller 14 as a change in voltage.

A so-called data logger is used as the recording device 33. The data logger 33 is an exclusive data logger including a board that has a bridge circuit that corresponds to the output of the strain gauges 32. The data logger 33 has connecting terminals to which the lead wires 32a of the strain gauges 32 are connected and connecting terminals for connecting to external devices such as a computer.

The data logger 33 is provided with a function of inputting an analog signal of the voltage generated in the strain gauges 32, a function of converting the input analog signal into a digital signal, a function of chronologically recording and storing the data converted into the digital signal, and a function of outputting the stored data to an external device such as a computer.

The data logger 33 is mounted on the tapered roller 14 via an installation jig 34. The installation jig 34 passes through the through-hole 22 of the tapered roller 14. As mentioned above, the first ring 23 and the second ring 24 of the cage 11 have insertion holes 23a, 24a for inserting the installation jig 34. The insertion holes 23a, 24a each have a radius that is slightly larger than that of the mounting hole for mounting the pin 25.

Figure 4:
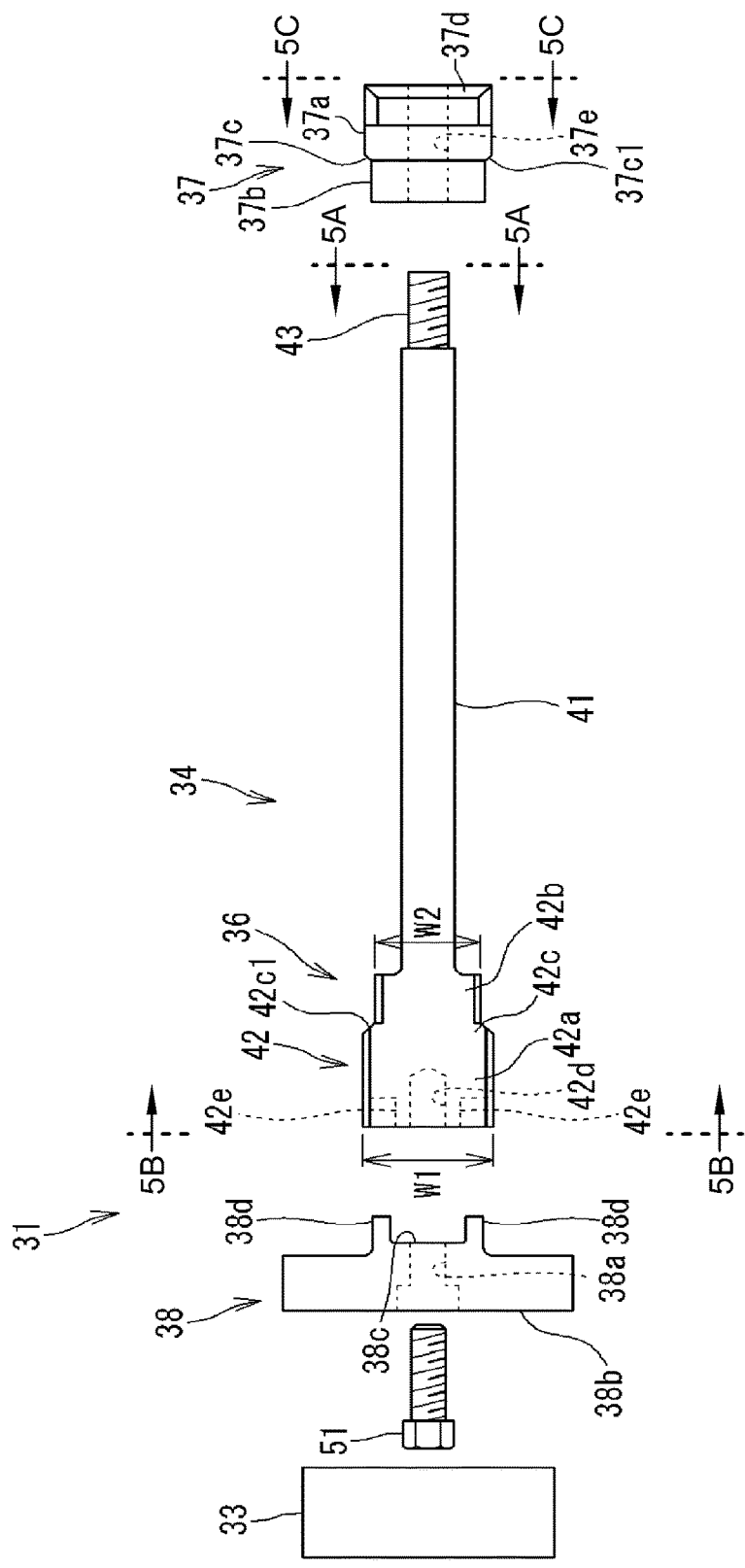
FIG. 4 is an exploded front view of the state detector.

FIG. 4 is an exploded front view of the state detector 31. The installation jig 34 consists of a bolt member 36, a nut member 37, and a holder member 38. The bolt member 36 has an elongated rod-like trunk portion 41, a head portion 42 provided on one end of the trunk portion 41 in the longitudinal direction, and an external thread portion 43 provided on the other end of the trunk portion 41 in the longitudinal direction.

Figure 5A:
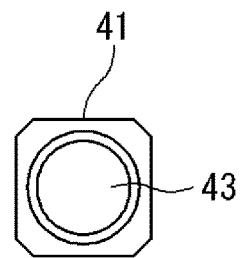
FIG. 5A is a sectional view taken along a line in FIG. 4.
Figure 5B:
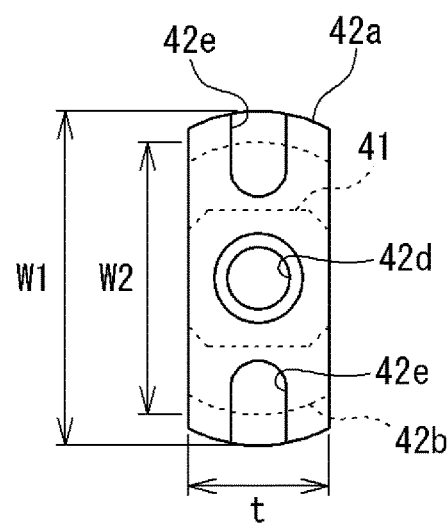
FIG. 5B is a sectional view taken along a line in FIG. 4.

FIG. 5A is a sectional view taken along a line (shown as 5A) in FIG. 4. FIG. 5B is a sectional view taken along a line (shown as 5B) in FIG. 4. As shown in FIG. 5A, the sectional shape of the trunk portion 41 is rectangular. Specifically, the sectional shape of the trunk portion 41 is formed by a square bar of which the cross section is generally square. The external thread portion 43 has a major diameter that is smaller than the width of the trunk portion 41. The external thread portion 43 has a shorter length in the longitudinal direction than the trunk portion 41.

As shown in FIG. 5B, the head portion 42 has a flat form (oval form) where the thickness t has the same dimension as one side of the trunk portion 41, and the widths W1, W2 both have a larger dimension than the width of the trunk portion 41. The head portion 42 has a wide width portion 42a that has a wider width W1, and a narrow width portion 42b that has a narrower width W2. A first step portion 42c is formed between the wide width portion 42a and the narrow width portion 42b. The first step portion 42c has a tapered surface 42c1 that gradually increases its width from the narrow width portion 42b to the wide width portion 42a. The head portion 42 forms a first engagement portion that engages with an inner peripheral edge 22a of the tapered roller 14 that is positioned on the outer edge (opening edge) of the through-hole 22 on the axial end surface of the tapered roller 14, as described below.

An internal thread hole 42d is formed at the central portion of the end of the wide width portion 42a in the width direction. The internal thread hole 42d is used for coupling with a holder member 38. An engaging recessed portion 42e is formed on both sides in the front end face of the wide width portion 42a in the width direction. The engaging recessed portion 42e is also used for coupling with the holder member 38. The bolt member 36 is inserted in the through-hole 22 from the small end side of the tapered roller 14.

Figure 5C:
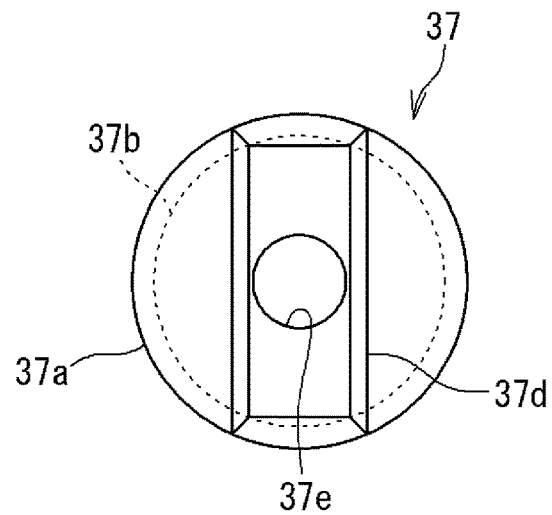
FIG. 5C is a sectional view taken along a line in FIG. 4.

As shown in FIG. 4, the nut member 37 has a generally cylindrical shape, and an internal thread hole 37e passes through the central part of the nut member 37. FIG. 5C is a sectional view taken along a line (shown as 5C) in FIG. 4. A tool engagement portion 37d for engaging a tool for fastening the nut member 37 is formed on one end of the nut member 37. The tool engagement portion 37d has a generally rectangular parallelepiped block shape. The nut member 37 has a large-diameter portion 37a that has a larger outer diameter, and a small-diameter portion 37b that has a smaller outer diameter. A second step portion 37c is formed between the large-diameter portion 37a and the small-diameter portion 37b. The outer diameter of the small-diameter portion 37b is slightly smaller than the inner diameter of the through-hole 22. The outer diameter of the large-diameter portion 37a is slightly larger than the inner diameter of the through-hole 22. The second step portion 37c has a tapered surface 37c1 that gradually increases its outer diameter from the small-diameter portion 27b to the large-diameter portion 37a. The nut member 37 forms a second engagement portion that engages with the inner peripheral edge 22a of the tapered roller 14, as described below.

Figure 6:
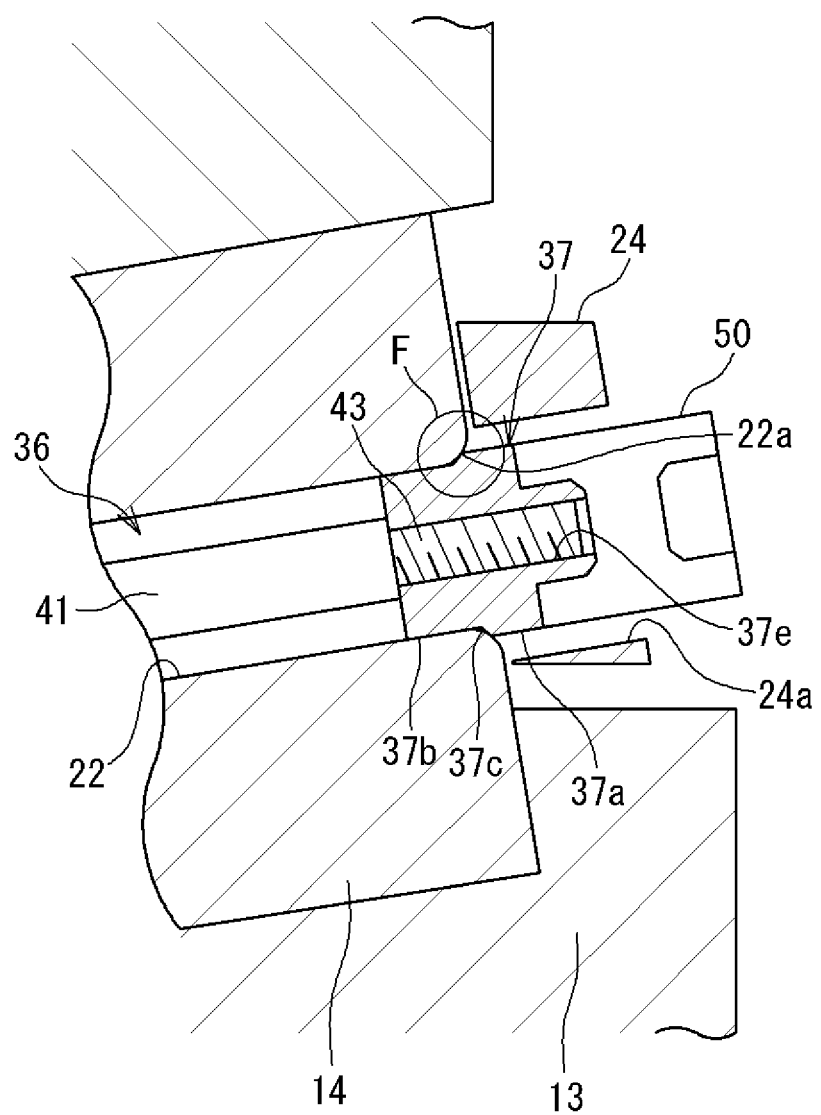
FIG. 6 is an enlarged sectional view of portion D in FIG. 1.

FIG. 6 is an enlarged sectional view of portion D in FIG. 1. The nut member 37 is fastened in the axial direction relative to the bolt member 36, by screwing the internal thread hole 37e to the external thread portion 43 of the bolt member 36 that is inserted in the through-hole 22. The nut member 37 can be rotated by using a tool 50 that is engaged with the tool engagement portion 37d of the nut member 37. The small-diameter portion 37b of the nut member 37 that is fastened to the bolt member 36 is inserted in the through-hole 22. Almost the entire large-diameter portion 37a is disposed on the outer side of the through-hole 22 in the axial direction. The second step portion 37c is in contact with and is engaged with the inner peripheral edge 22a of the tapered roller from the outer side of the tapered roller 14 in the axial direction.

Figure 8:
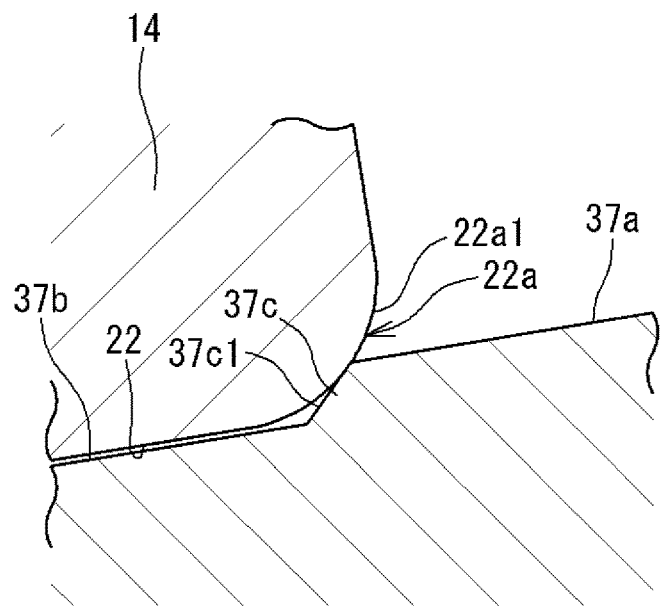
FIG. 8 is an enlarged sectional view of portion F in FIG. 6.

FIG. 8 is an enlarged sectional view of portion F in FIG. 6. A round-chamfered portion 22a1 is formed on the inner peripheral edge 22a of the tapered roller 14. The tapered surface (engaged surface) 37c1 of the second step portion 37c is in contact with the chamfered portion 22a1 of the inner peripheral edge 22a of the tapered roller 14. When the nut member 37 is fastened to the bolt member 36, the nut member 37 is pulled towards the inner side of the through-hole 22 in the axial direction, and the tapered surface 37c1 is strongly pressed against the chamfered portion 22a1. Thus, the nut member 37 can be firmly engaged with one end of the tapered roller 14 in the axial direction.

After the nut member 37 is screwed to the bolt member 36, the nut member 37 is completely fixed on to the bolt member 36 by crushing the ridge of the external thread portion 43 or the internal thread hole 37e, so that it cannot be removed. Thus, it is possible to firmly fasten the bolt member 36 to the nut member 37 without producing slack in the fastening of the bolt member 36 and the nut member 37.

Figure 7:
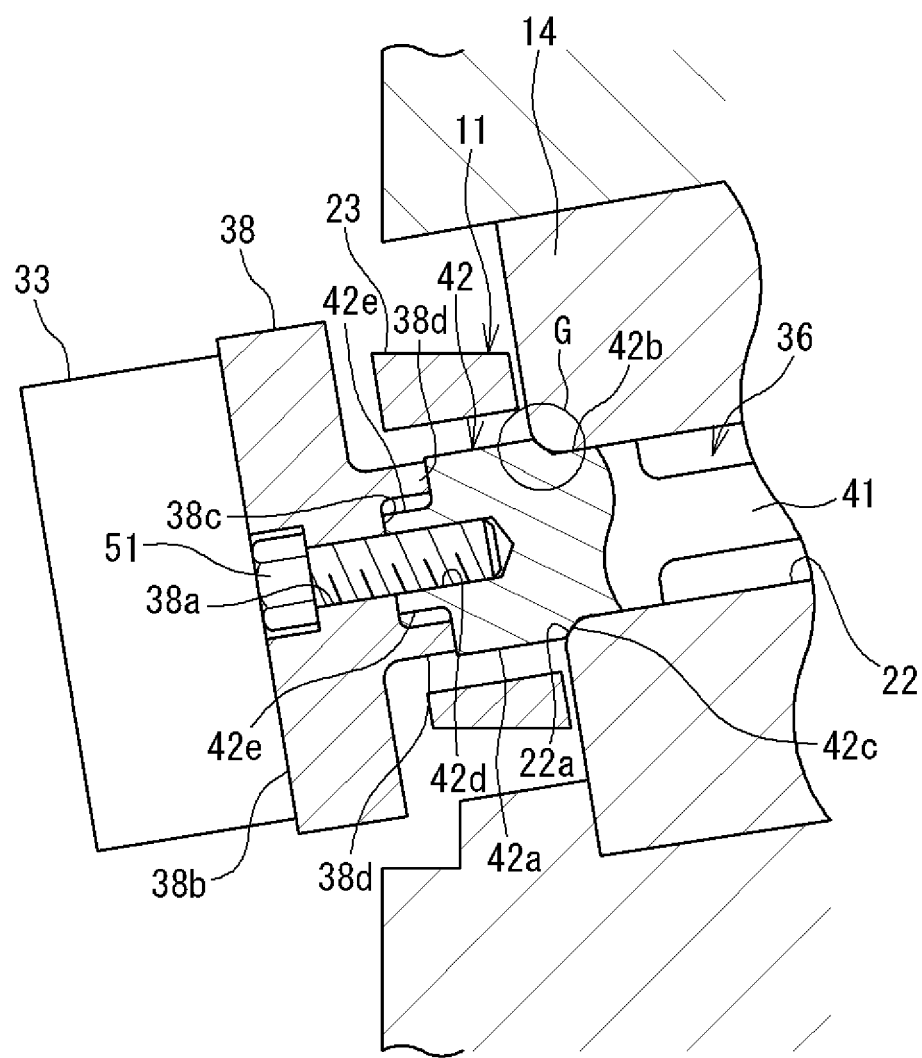
FIG. 7 is an enlarged sectional view of portion E in FIG. 1.

FIG. 7 is an enlarged sectional view of portion E in FIG. 1. The narrow width portion 42b of the head portion 42 of the bolt member 36 is inserted in the through-hole 22. The wide width portion 42a of the head portion 42 of the bolt member 36 is disposed on the outer side of the through-hole 22 in the axial direction. The first step portion 42c is in contact with and is engaged with the inner peripheral edge 22a of the tapered roller 14 from the outer side of the tapered roller 14 in the axial direction.

Figure 9:
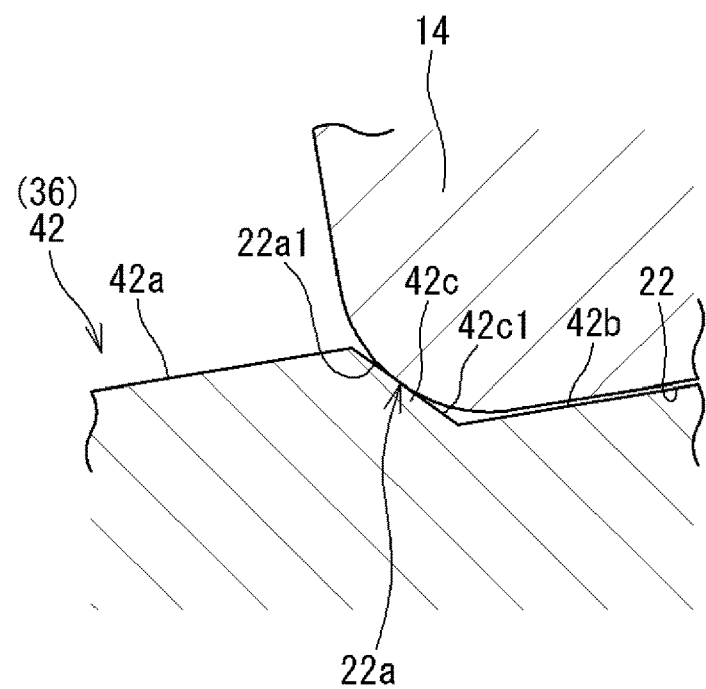
FIG. 9 is an enlarged sectional view of portion G in FIG. 7.

FIG. 9 is an enlarged sectional view of portion G in FIG. 7. The tapered surface (engaged surface) 42c1 of the first step portion 42c of the bolt member 36 is in contact with the round-chamfered portion 22a1 of the inner peripheral edge 22a of the tapered roller 14. When the nut member 37 is fastened to the bolt member 36, the bolt member 36 is pulled towards the inner side of the through-hole 22 in the axial direction, and the tapered surface 42c1 is strongly pressed against the chamfered portion 22a1. Thus, the bolt member 36 can be firmly engaged with the other end of the tapered roller 14 in the axial direction.

As shown in FIG. 4, the holder member 38 has a cylindrical shape, and has in its center a bolt hole 38a for inserting a mounting bolt 51 for mounting the holder member 38 to the bolt member 36. An attaching surface 38b for attaching the data logger 33 is provided on one axial end face of the holder member 38. A mounting surface 38c for mounting the holder member 38 to the bolt member 36 is provided on the other axial end face of the holder member 38. Two engaging protrusions 38d that protrude towards the bolt member 36 are provided on the mounting surface 38c.

As shown in FIG. 7, the holder member 38 is mounted on the bolt member 36 by fastening the mounting bolt 51 that is inserted in the bolt hole 38a to the internal thread hole 42d, with the mounting surface 38c abutted with the leading end surface of the head portion 42 of the bolt member 36. The engaging protrusion 38d of the holder member 38 is engaged with the bolt member 36 by being inserted in the engaging recessed portion 42e of the bolt member 36. Rotation of the holder member 38 around the axis relative to the bolt member 36 is prevented by this engagement. The data logger 33 is attached to the attaching surface 38b of the holder member 38 by a mounting screw etc. that is not shown. The data logger 33 is disposed on the small end side of the tapered roller 14 of the tapered roller bearing 10 and more toward the outer side in the axial direction than the first ring 23 of the cage 11.

As shown in FIG. 2, the lead wires 32a of the sensors 32 are drawn out toward the head portion 42 of the bolt member 36. Specifically, the lead wires 32a are drawn out toward the head portion 42 along one side surface 41a of the trunk portion 41 of the bolt member 36. The one side surface 41a of the trunk portion 41 is disposed to be nearly flush with one side surface 42f of the head portion 42. The lead wires 32a are fixed to one side surface 42f of the head portion 42 by an adhesive agent 45.

Figure 10:
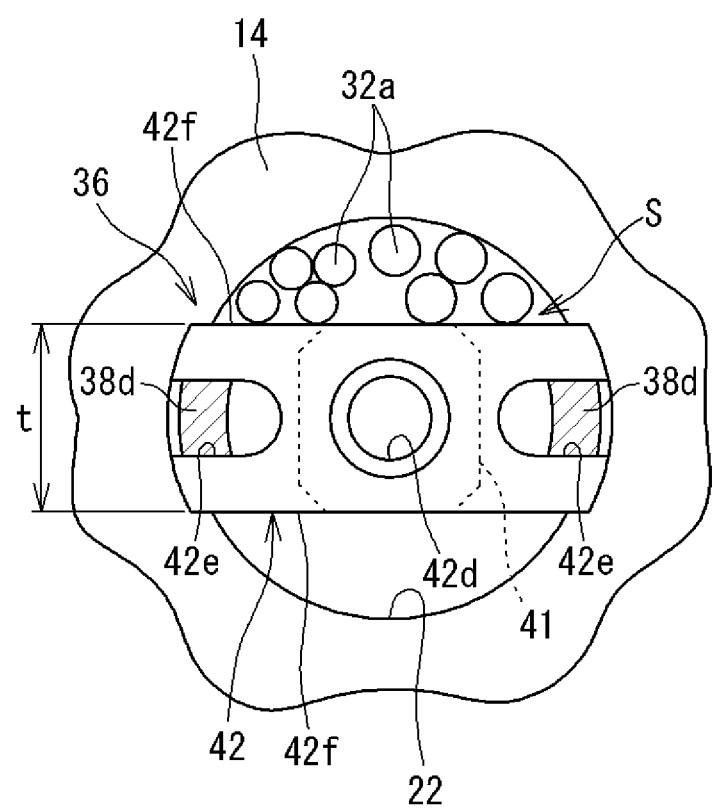
FIG. 10 is a sectional view taken along the line H-H in FIG. 2.
Figure 11:
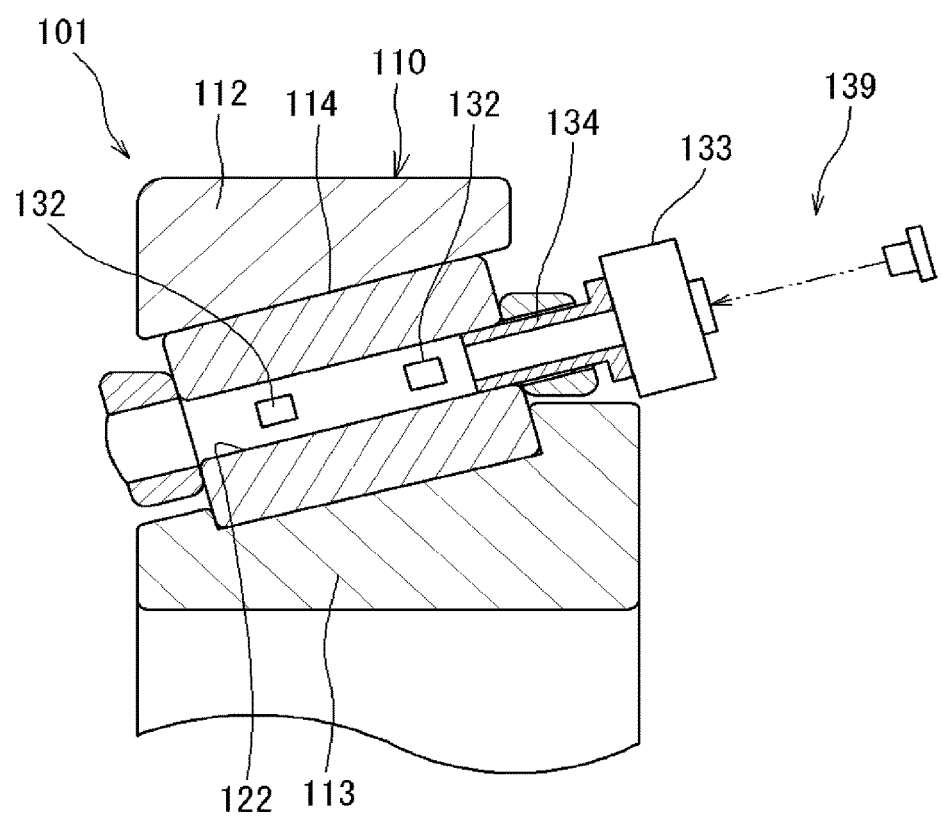
FIG. 11 is a longitudinal sectional view illustrating a roller bearing device according to the related art.

FIG. 10 is a sectional view taken along the line H-H in FIG. 2. The head portion 42 has a thickness t that is smaller than the inner diameter of the through-hole 22. A space S is formed between the side surface 42f of the head portion 42 and the inner peripheral surface of the through-hole 22. The lead wires 32a are drawn out from the inside of the through-hole 22 to the outside of the through-hole 22 through the space S. In other words, the head portion 42 of the bolt member 36 has the side surface 42f for forming the wiring space S in which the lead wires 32a are inserted. With this structure, it is possible to draw out the lead wires 32a of the sensors 32 smoothly without interfering with the surrounding objects.

As shown in FIG. 2, a recessed groove 38e for drawing the lead wires 32a outside while avoiding interference with the cage 11 is formed on the holder member 38. The lead wires 32a are prevented from interfering with the holder member 38. The lead wires 32a are drawn out along one side surface of the trunk portion 41 that has a square (rectangular) cross-section. Thus, it is possible to prevent the lead wires 32a from twisting around the trunk portion 41, and draw out the lead wires 32a linearly toward the wiring space S.

In the state detector 31 of the embodiment with the above configuration, the installation jig 34 is installed in the tapered roller 14 by engaging the head portion (first engagement portion) 42 of the bolt member 36 and one end portion of the tapered roller 14 in the axial direction as well as the nut member (second engagement portion) 37 and the other end portion of the tapered roller 14 in the axial direction from the outer side in the axial direction, and sandwiching the tapered roller 14 between the head portion 42 and the nut member 37. The installation jig 34 is firmly installed in the tapered roller 14, while movement in the axial direction and rotation around the axis of the installation jig 34 are restricted. Thus, it is possible to suitably maintain the state in which the data logger 33 is attached to the tapered roller 14 and the installation jig 34 does not become separated from the tapered roller 14.

The installation jig 34 is made of material that has the same linear thermal expansion coefficient as the tapered roller 14. For example, the installation jig 34 is made of the same material as the tapered roller 14. When the tapered roller bearing 10 is exposed to a high temperature, the tapered roller 14 expands due to the heat, as well as the installation jig 34 installed in the tapered roller 14. If the installation jig 34 expands in the axial direction more than the tapered roller 14, the head portion 42 and/or the nut member 37 will separate from the tapered roller 14, the installation jig 34 will become loose, and rotation of the installation jig 34 around the axis will be allowed. If the installation jig 34 rotates, there is a possibility that the lead wires 32a described below will get tangled with the installation jig 34 or will interfere with the cage 11 and become disconnected. In the embodiment, these inconveniences can be eliminated since the installation jig 34 is made of material that has the same linear thermal expansion coefficient as the tapered roller 14.

The installation jig 34 may be made of material that has a smaller linear thermal expansion coefficient than the tapered roller 14. In this case, when the roller bearing 10 is exposed to a high temperature, the head portion (first engagement portion) 42 of the installation jig 34 and one end portion of the tapered roller 14 in the axial direction as well as the nut member (second engagement portion) 37 and the other end portion of the tapered roller 14 in the axial direction engage strongly, since the tapered roller 14 expands larger than the installation jig 34. Thus, it is possible to install the installation jig 34 more firmly in the tapered roller 14.

The installation jig 34 has the holder member 38 that is separate from the bolt member 36. If the holder member 38 were to be formed integrally with the bolt member 36, the holder member 38 becomes an obstacle, and it will be difficult to determine whether the first step portion 42c is engaged with the inner peripheral edge 22a of the tapered roller 14 when fastening the nut member 37 to the bolt member 36. In the embodiment, it is possible to fasten the bolt member 36 and the nut member 37 together without mounting the holder member 38, since the holder member 38 is separated from the bolt member 36. It has become easier to check if the first step portion 42c is engaged with the inner peripheral edge 22a of the tapered roller 14 when fastening.

The lead wires 32a of the sensors 32 are drawn out without mounting the holder member 38, after the bolt member 36 and the nut member 37 are fastened together. Thus, it is possible to draw out the lead wires 32a so that they do not slack, and it is easier to carry out an operation of adhering the lead wires 32a to the bolt member 36 (an operation to provide the adhesive agent 45). The lead wires 32a can be prevented from moving due to vibration during operation, by preventing the lead wires 32a from slacking. Thus, it is possible to prevent the lead wires 32a from coming into contact with the tapered roller 14 or the cage 11 and being damaged.

In the embodiment, the detection signals from the strain gauges 32 are recorded and stored in the data logger 33 via the lead wires 32a. Once the data has been stored, the data logger 33 is removed by disconnecting the installation jig 34. By connecting the data logger 33 to an external computer etc., the stored data is removed and analyzed. The known method may be applied as a specific analyzing method, similar to the related art (for example, Japanese Patent Application Publication No. 2011-149538 (JP 2011-149538 A)).

The embodiments described above are illustrative and not restrictive in all respects. The roller bearing device according to the invention is not limited to the illustrated embodiment, and may be implemented in other embodiments within the scope of the invention. For example, the roller bearing 10 of the invention may be a cylindrical roller bearing and may not be limited to the tapered roller bearing 10. The roller bearing 10 of the invention may be a normal roller bearing that does not have the pin type cage 11. In this case, a hole may be provided that passes through the tapered roller 14 that is the detection object in the axial direction, and the strain gauges 32 or the data logger 33 may be installed in the hole.

Although the holder member 38 of the installation jig 34 is mounted on the bolt member 36 in the embodiment, the holder member 38 of the installation jig 34 may be mounted on the nut member 37. In this case, a wiring space for drawing out the lead wires 32a may be formed between the outer peripheral surface (side surface) of the nut member 37 and the inner peripheral edge 22a of the tapered roller 14. The holder member 38 may be formed integrally with the bolt member 36 or the nut member 37. Although two strain gauges 32 are provided in the tapered roller 14 in the embodiment above, one or more than three strain gauges 32 may be provided.

In the embodiment above, the state detector 31 has a strain gauge as the sensor 32. However, the state detector 31 may have as the sensor 32 other sensors such as a thermocouple that detects the temperature of the tapered roller 14. Although the engaged surfaces 42c1, 37c1 of the first and second step portions 42c, 37c of the installation jig 34 are tapered, and the chamfered portion 22a1 of the inner peripheral edge 22a of the tapered roller 14 is rounded, this relationship may be reversed.

The invention can prevent the recording device from detaching from the roller.

What is claimed is:

1. A state detector for a roller bearing, the state detector comprising:
    a sensor mounted inside a through-hole formed in the center of a roller of the roller bearing device;
    a recording device that records a detection signal from the sensor; and
    an installation jig for installing the recording device on the roller, the installation jig being a unitary piece separable from a cage of the roller bearing, the installation jig being configured to be insertable into the cage wherein
    the installation jig passes through the through-hole, and has a first engagement portion that engages with one axial end portion of the roller from an outer side in an axial direction, and a second engagement portion that engages with the other axial end portion of the roller from the outer side in the axial direction.

2. The state detector for a roller bearing according to claim 1, wherein the installation jig includes a bolt member that has the first engagement portion, and a nut member that has the second engagement portion and is fastened to the bolt member in the axial direction of the roller.

3. The state detector for a roller bearing according to claim 2, wherein
the installation jig has a holder member for attaching the recording device, the holder member being separate from the bolt member and the nut member.

4. A roller bearing device comprising:
a roller bearing; and
the state detector according to claim 3, wherein
the roller bearing includes:
an inner ring having an inner ring raceway;
an outer ring having an outer ring raceway that is disposed radially outward of the inner ring raceway;
a roller that is disposed between the inner ring raceway and the outer ring raceway; and
the cage that holds the roller.

5. A roller bearing device comprising:
a roller bearing; and
the state detector according to claim 2, wherein
the roller bearing includes:
an inner ring having an inner ring raceway;
an outer ring having an outer ring raceway that is disposed radially outward of the inner ring raceway;
a roller that is disposed between the inner ring raceway and the outer ring raceway; and
the cage that holds the roller.

6. The state detector for a roller bearing according to claim 1, wherein
the first engagement portion and the second engagement portion are each engaged with an inner peripheral edge of the roller that is positioned on an opening edge of the through-hole.

7. The state detector for a roller bearing according to claim 6, wherein
a chamfered portion is formed on the inner peripheral edge of the roller, the first and second engagement portions each have an engaged surface that is in contact with the chamfered portion, and either one of the chamfered portion and the engaged surface is rounded and the other is tapered.

8. A roller bearing device comprising:
a roller bearing; and
the state detector according to claim 6, wherein
the roller bearing includes:
an inner ring having an inner ring raceway;
an outer ring having an outer ring raceway that is disposed radially outward of the inner ring raceway;
a roller that is disposed between the inner ring raceway and the outer ring raceway; and
the cage that holds the roller.

9. A roller bearing device comprising:
a roller bearing; and
the state detector according to claim 7, wherein
the roller bearing includes:
an inner ring having an inner ring raceway;
an outer ring having an outer ring raceway that is disposed radially outward of the inner ring raceway;
a roller that is disposed between the inner ring raceway and the outer ring raceway; and
the cage that holds the roller.

10. The state detector for a roller bearing according to claim 1, wherein
a space for wiring is provided between at least one of the first engagement portion and the second engagement portion and the inner peripheral edge of the roller.

11. A roller bearing device comprising:
a roller bearing; and
the state detector according to claim 10, wherein
the roller bearing includes:
an inner ring having an inner ring raceway;
an outer ring having an outer ring raceway that is disposed radially outward of the inner ring raceway;
a roller that is disposed between the inner ring raceway and the outer ring raceway; and
the cage that holds the roller.

12. A roller bearing device comprising:
a roller bearing; and
the state detector according to claim 1, wherein
the roller bearing includes:
an inner ring having an inner ring raceway;
an outer ring having an outer ring raceway that is disposed radially outward of the inner ring raceway;
a roller that is disposed between the inner ring raceway and the outer ring raceway; and
the cage that holds the roller.

* * * * *